(12) United States Patent
Tabutin et al.

(10) Patent No.: US 12,459,791 B2
(45) Date of Patent: Nov. 4, 2025

(54) LIFTING EYES FOR COUNTERWEIGHTS

(71) Applicant: Caterpillar Inc., Peoria, IL (US)

(72) Inventors: Simon Tabutin, Annecy (FR); Sean D. Lawson, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 269 days.

(21) Appl. No.: 18/331,987

(22) Filed: Jun. 9, 2023

(65) Prior Publication Data

US 2024/0409376 A1 Dec. 12, 2024

(51) Int. Cl.
*B66C 23/76* (2006.01)

(52) U.S. Cl.
CPC .................................... *B66C 23/76* (2013.01)

(58) Field of Classification Search
CPC ......... B66C 23/72; B66C 23/74; B66C 23/76; B66C 23/44; E02F 9/18; B62D 49/085
See application file for complete search history.

(56) References Cited

U.S. PATENT DOCUMENTS

| | | | | |
|---|---|---|---|---|
| 2,674,378 A * | 4/1954 | Meyer | B66C 23/74 | 212/178 |
| 3,635,493 A * | 1/1972 | Barth | B62D 49/085 | 280/759 |
| 3,709,520 A * | 1/1973 | Johnson | B62D 49/085 | 280/759 |
| 3,758,132 A * | 9/1973 | Elfes | B62D 49/085 | 280/759 |
| 3,822,073 A * | 7/1974 | Sieren | B62D 49/085 | 280/760 |
| 3,944,252 A * | 3/1976 | Barth | B62D 49/085 | 280/759 |
| 4,094,534 A * | 6/1978 | Welke | B62D 49/085 | 280/760 |
| 4,299,405 A * | 11/1981 | Withers | B60D 1/02 | 280/495 |
| 4,377,300 A * | 3/1983 | Old | B62D 49/085 | 280/758 |
| 4,462,611 A * | 7/1984 | Sieren | B62D 49/085 | 280/759 |
| 4,659,102 A * | 4/1987 | Stuhrmann | B62D 49/085 | 172/275 |
| 5,219,180 A * | 6/1993 | Zipser | B60G 9/02 | 280/759 |
| 5,255,931 A * | 10/1993 | Hurlburt | B60K 17/30 | 180/266 |
| 7,669,898 B2 * | 3/2010 | Hamaguchi | E02F 9/18 | 280/759 |

(Continued)

FOREIGN PATENT DOCUMENTS

| | | |
|---|---|---|
| CN | 201605572 U | 10/2010 |
| EP | 1205422 B1 | 10/2004 |
| JP | 2020084676 A | 6/2020 |

*Primary Examiner* — Anna M Momper
*Assistant Examiner* — Juan J Campos, Jr.

(57) ABSTRACT

In some implementations, a counterweight assembly, for a lifting machine, includes a plurality of counterweight slabs, including first and second outer counterweight slabs, and one or more inner counterweight slabs sandwiched between inner lateral surfaces of the first and second outer counterweight slabs. A center slab, of the one or more inner counterweight slabs, includes a lifting eye embedded in a body of the center slab.

19 Claims, 3 Drawing Sheets

(56) References Cited

U.S. PATENT DOCUMENTS

| | | | |
|---|---|---|---|
| 8,662,460 B2* | 3/2014 | Heimbuch | B62D 49/085 |
| | | | 280/759 |
| 10,407,283 B2* | 9/2019 | Mori | E02F 9/18 |
| 10,843,908 B2 | 11/2020 | Herse | |
| 10,850,952 B2* | 12/2020 | Pletz | F16L 1/11 |
| 2012/0153605 A1 | 6/2012 | Hetzel | |
| 2015/0246795 A1* | 9/2015 | Copeland | E02F 9/18 |
| | | | 212/197 |
| 2017/0210432 A1* | 7/2017 | Cartechini | B62D 49/085 |
| 2018/0044150 A1* | 2/2018 | Mori | B66C 23/74 |

* cited by examiner

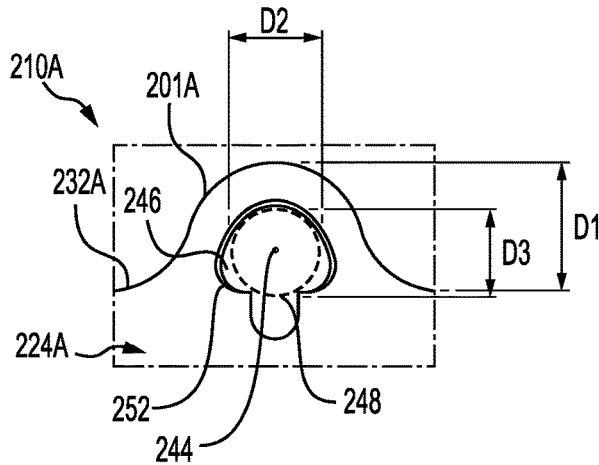 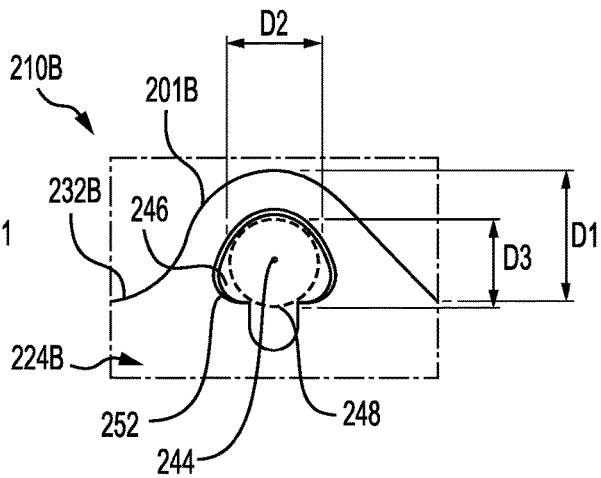
FIG. 4A  FIG. 4B
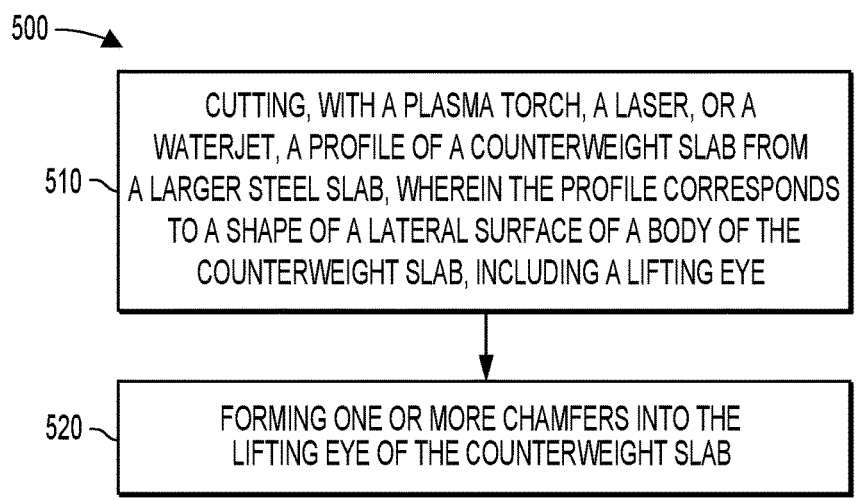
FIG. 5

LIFTING EYES FOR COUNTERWEIGHTS

TECHNICAL FIELD

The present disclosure relates generally to counterweights and, for example, to lifting eyes for counterweights.

BACKGROUND

A pipelayer is a machine that is used for installing large, heavy pipeline segments into the earth and/or above ground. During operation, the pipelayer machine extends the weight of the segment laterally away from the chassis, engine, and undercarriage of the pipelayer machine (e.g., with the weight being cantilevered out over surrounding terrain). Depending on the weight of the segment being lifted and the length of the boom, the pipelayer machine may be subject to potential tipping and instability. Counterweights, which are positioned on an opposite side of the pipelayer machine from the boom, counteract the weight of the segment being lifted to increase lifting capacity and resist tipping.

Generally, counterweights are to be installed and removed from machines as needed. For example, different counterweights and/or sizes of counterweights may be used on the same machine. Counterweights that have bolted on or welded on lifting hardware (e.g., lifting eyes or loops) have greater inherent risk of failure from loose components or crack welds and/or may require further machining or welding operations to add the bolted on or welded on lifting hardware. Accordingly, bolted on or welded on lifting hardware may be less robust (e.g., lower strength), less safe, more prone to failure, and higher cost.

The apparatus of the present disclosure solves one or more of the problems set forth above and/or other problems in the art.

SUMMARY

A counterweight assembly, for a lifting machine, includes: a plurality of counterweight slabs, including: first and second outer counterweight slabs; and one or more inner counterweight slabs sandwiched between inner lateral surfaces of the first and second outer counterweight slabs, wherein a center slab, of the one or more inner counterweight slabs, includes a lifting eye embedded in a body of the center slab.

In some implementations, a counterweight slab, for a lifting machine, having a body, includes: a first lateral surface; a second lateral surface facing away from the first lateral surface; a side surface that connects together the first lateral surface and the second lateral surface; and a lifting eye embedded in the body, wherein the lifting eye includes an opening that is aligned with an axis that is parallel to the side surface.

In some implementations, a method of manufacturing a counterweight slab, for a lifting machine, includes: cutting, with a plasma torch, a laser, or a waterjet, a profile of the counterweight slab from a larger steel slab, wherein the profile corresponds to a shape of a first lateral surface of a body of the counterweight slab, and wherein the body further includes: a second lateral surface facing away from the first lateral surface; a side surface that connects together the first lateral surface and the second lateral surface; and a lifting eye embedded in the body.

BRIEF DESCRIPTION OF THE DRAWINGS

FIG. 4A is an enlarged diagram of a lifting eye portion of the example center counterweight slab, of the first counterweight assembly, described herein.

FIG. 4B is an enlarged diagram of a lifting eye portion of the example center counterweight slab, of the second counterweight assembly, described herein.

FIG. 5 is a flow diagram of an example method of manufacturing a counterweight slab described herein.

DETAILED DESCRIPTION

This disclosure relates to counterweights, which are applicable to any lifting machine. The term "lifting machine" may refer to any machine that performs a lifting operation associated with an industry such as, for example, mining, construction, farming, transportation, or another industry. For example, the lifting machine may be a pipelayer machine, an earthmoving machine (e.g., a track-type tractor or wheel loader), and/or other machines.

Figure 1:
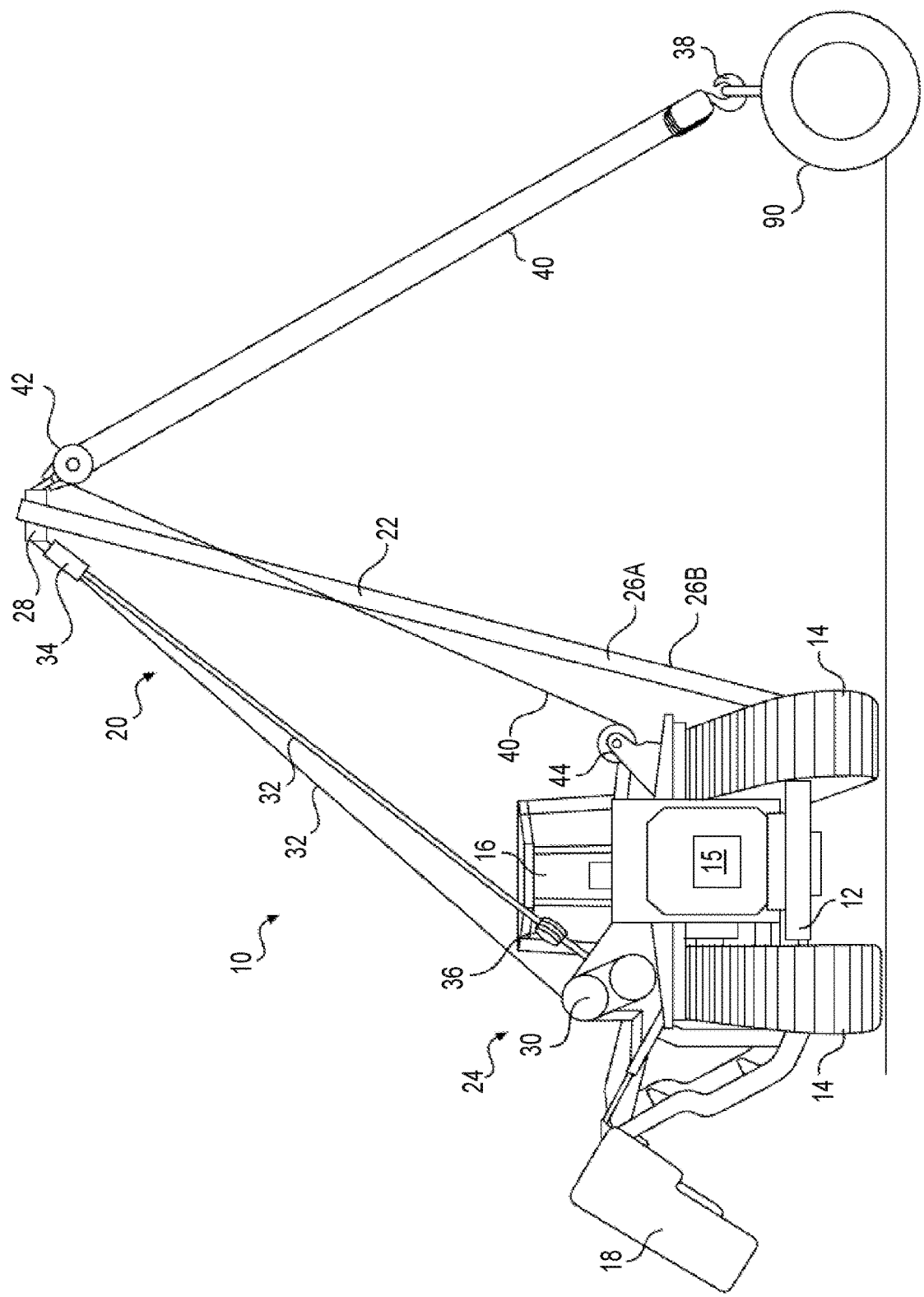
FIG. 1 is a diagram of an example lifting machine described herein.

FIG. 1 is a diagram an example lifting machine described herein. For example, FIG. 1 depicts a front view of a mobile pipelayer machine 10. As shown in FIG. 1, the pipelayer machine 10 includes a chassis 12, a pair of drive tracks 14 engaged with a ground surface, a power source 15 (e.g., an internal combustion engine), an operator cab 16, a counterweight 18 (e.g., a movable counterweight assembly) mounted on the chassis 12, and a crane assembly 20 mounted on the chassis 12 opposite the counterweight 18. The pipelayer machine 10 defines a longitudinal axis, oriented into the plane of the page, from a front end (facing towards the viewer) to a rear end (facing away from the viewer).

The crane assembly 20 includes a boom 22 and a winch system 24 configured to drive lifting operations of the pipelayer machine 10. The boom 22 includes a pair of legs (e.g., front leg 26A and rear leg 26B) that, at a proximal end, may be spaced apart and independently hinged to the chassis 12. The legs 26A-B extend away from the chassis 12 and are joined together at boom tip 28. The winch system 24 includes a winch 30 and a first set of lifting cables 32 extending from the winch 30. The first lifting cables 32 are coupled to a series of pulleys, or sheaves (e.g., first pulley 34 and second pulley 36), to raise and lower the boom 22.

The winch system 24 includes a terminating connector (e.g., grapple hook 38) to couple the crane assembly 20 to the object (e.g., pipe 90) being lifted. The winch system 24 includes a second set of lifting cables 40 extending from the winch 30. The second lifting cables 40 are coupled to a series of pulleys, or sheaves (e.g., third pulley 42 and fourth pulley 44), to raise and lower the grapple hook 38.

As indicated above, FIG. 1 is provided as an example. Other examples may differ from what was described in connection with FIG. 1. For example, aspects of the present disclosure may be embodied within, in addition to mobile pipelayer machines, any lifting machine having a crane assembly 20.

Figure 2A:
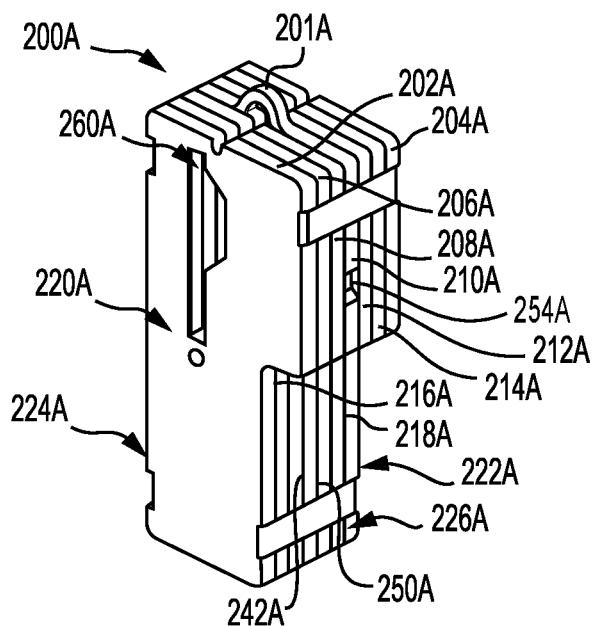
FIG. 2A is a diagram of a perspective view of an example first counterweight assembly described herein.
Figure 2B:
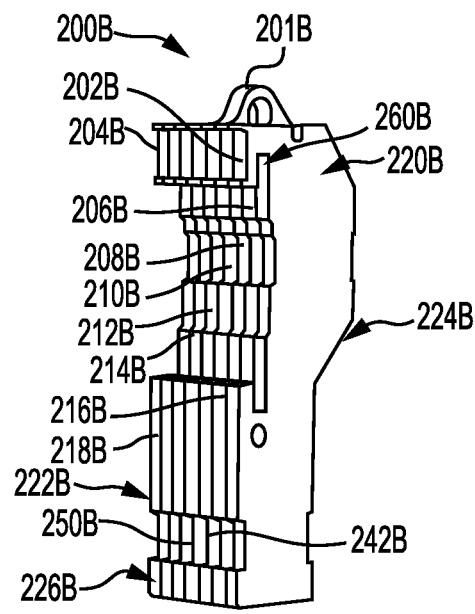
FIG. 2B is a diagram of a perspective view of an example second counterweight assembly described herein.

FIG. 2A is a diagram of a perspective view of an example first counterweight assembly 200A described herein. FIG. 2B is a diagram of a perspective view of an example second counterweight assembly 200B described herein. The first and second counterweight assemblies 200A/B vary in size, shape, and weight and are configured to be implemented with different size machines. For example, the first counterweight assembly 200A may be used on relatively larger machines (e.g., PL83 and PL87 model pipelayers), whereas the second counterweight assembly 200B may be used on relatively smaller machines (e.g., PL72 model pipelayers).

Each counterweight assembly 200A/B includes a plurality of counterweight slabs, or plates. The individual counterweight slabs, of each counterweight assembly 200A/B, may be assembled together (e.g., bolted or welded) into a unitized block. Each counterweight assembly 200A/B includes a first outer counterweight slab (e.g., front slab 202A/B) and a second outer counterweight slab (e.g., rear slab 204A/B). Each counterweight assembly 200A/B further includes one or more inner counterweight slabs (e.g., 5 inner slabs, such as inner slabs 206A/B, 208A/B, 210A/B, 212A/B, 214A/B). In some examples, each counterweight assembly may include, without limitation, from 1 to 5 inner slabs, such as 1, 2, 3, 4, or 5 inner slabs. For example, with an odd number of inner slabs, such as 1, 3, or 5 inner slabs (as shown in FIGS. 2A and 2B), the inner slab 210A/B is centered with respect to the remaining slabs, and thus, also may be referred to herein as the "center slab." In some examples, all slabs of the counterweight assembly 200A/B may be formed from the same material. A lifting eye 201A/B is defined on the center slab 210A/B, as described in more detail herein.

In some examples, the center slab 210A/B may be formed from a different material from the other slabs. For example, the non-center slabs (e.g., outer slabs 202A/B, 204A/B and inner slabs 206A/B, 208A/B, 212A/B, 214A/B) may be formed from a low grade steel material (e.g., cobble plate), which may include ballast or counterweight material that is a low grade byproduct from steel mill processing. The center slab 210A/B, on the other hand, may be formed from relatively higher grade steel material (e.g., a grade of steel that exhibits one or more enhanced properties, such as yield strength and/or ultimate strength, that are greater than corresponding properties of the low grade steel material described above). For example, the higher grade steel material of the center slab 210A/B (including the lifting eye 201A/B), compared to the low grade steel material of the non-center slabs, may support 2× load without plasticity (e.g., 2× increase in yield strength) and/or may support 3× load without failure (e.g., 3× increase in ultimate strength). The higher grade steel of the center slab 210A/B causes an improvement in quality (e.g., slab soundness and/or slab strength) of the center slab 210A/B, compared to the other slabs, that is especially important when the lifting eye 201A/B is defined on the center slab 210A/B. For example, the improved quality of the higher grade steel of the center slab 210A/B may impart additional strength, robustness, and safety to the lifting eye 201A/B, compared to the low grade steel of the other slabs. Likewise, the improved quality of the higher grade steel of the center slab 210A/B may impart additional strength, robustness, and safety to the lifting eye 201A/B, compared to welded on or bolted on lifting devices, that may introduce inherent failure risks (e.g., via crack welds or loose attachments) that result from the additional components.

The inner counterweight slabs are sandwiched between an inner lateral surface, or face, 216A/B of the front slab 202A/B and an inner lateral surface, or face, 218A/B of the rear slab 204A/B. Each counterweight assembly 200A/B includes a mounting structure 260A/B configured to engage a corresponding structure on the pipelayer machine 10. Each counterweight assembly 200A/B may be mounted on the pipelayer machine 10 with the front slab 202A/B nearest the front end, the rear slab 204A/B nearest the rear end, and the inner slabs 206A/B, 208A/B, 210A/B, 212A/B, 214A/B stacked, along the longitudinal axis of the pipelayer machine 10, from the front end to the rear end.

An outer lateral surface, or face, 220A/B of the front slab 202A/B may be a front surface configured to face a forward direction of the pipelayer machine 10. Likewise, an outer lateral surface, or face, 222A/B of the rear slab 204A/B may be a rear surface configured to face a reverse direction of the pipelayer machine 10.

As indicated above, FIGS. 2A-B are provided as examples. Other examples may differ from what was described in connection with FIGS. 2A-B.

Figure 3A:
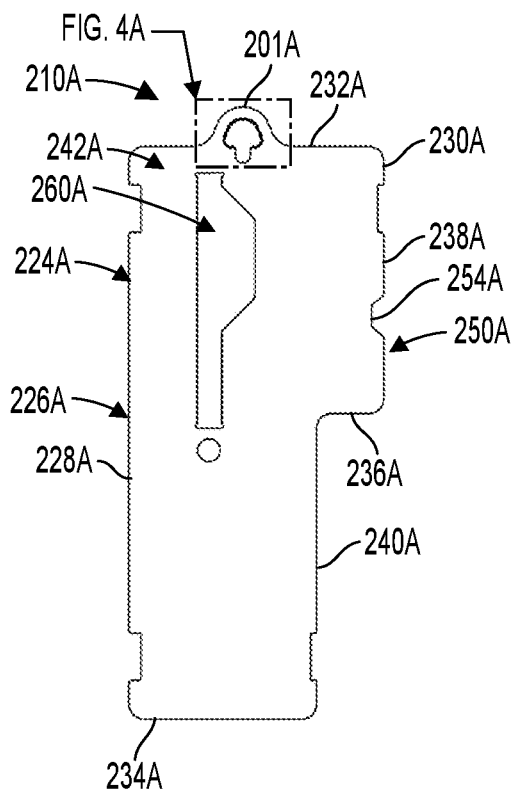
FIG. 3A is a diagram of a front view of an example center counterweight slab, of the first counterweight assembly, described herein.
Figure 3B:
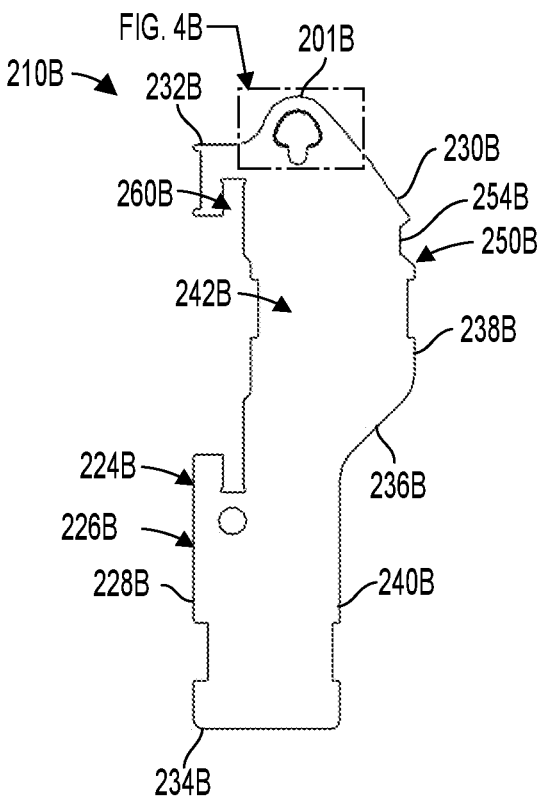
FIG. 3B is a diagram of a front view of an example center counterweight slab, of the second counterweight assembly, described herein.

FIG. 3A is a diagram of a front view of an example center slab 210A, of the first counterweight assembly 200A, described herein. FIG. 3B is a diagram of a front view of an example center slab 210B, of the second counterweight assembly 200B, described herein.

Note that the non-center slabs (e.g., outer slabs 202A/B, 204A/B and inner slabs 206A/B, 208A/B, 212A/B, 214A/B) may be substantially the same as the center slab 210A/B, apart from the lifting eye 201A/B defined on the center slab 210A/B.

Referring, collectively, to FIGS. 3A-B, a body 224A/B of the center slab 210A/B may be L-shaped (e.g., an inverted L-shape). The body 224A/B includes a first lateral surface 242A/B (e.g., a forward-facing lateral surface), a second lateral surface 250A/B (e.g., a rearward-facing lateral surface) facing away from the first lateral surface (e.g., oriented into the plane of the page in FIGS. 3A-B), and a side surface 226A/B extending around a perimeter of the body 224A/B. The side surface 226A/B connects together the first lateral surface 242A/B and the second lateral surface 250A/B. In some examples, all slabs of the counterweight assembly 200A/B may have the same thickness (e.g., along the side surface 226A/B). For example, a thickness of the center slab 210A/B may be equal to the thickness of all other slabs. In certain examples, a thickness of at least one slab may be different from the thickness of one or more other slabs. For example, the thickness of the center slab 210A/B may be different from (e.g., greater than or less than) a thickness of one or more other slabs (e.g., different from all non-center slabs).

Referring, collectively, to FIGS. 3A-B, the first lateral surface 242A/B includes an outside edge 228A/B, an inside edge 230A/B, a top edge 232A/B, and a bottom edge 234A/B. The outside edge 228A/B may be a greater distance away from the pipelayer machine 10 compared to the inside edge 230A/B. The inside edge 230A/B has a step 236A/B defining an upper portion 238A/B and a lower portion 240A/B. The upper portion 238A/B may be wider than the lower portion 240A/B. The upper portion 238A/B may be a greater distance away from a ground surface compared to the lower portion 240A/B. The top edge 232A/B connects the outside edge 228A/B and the upper portion 238A/B. The bottom edge 234A/B connects the outside edge 228A/B and the lower portion 240A/B.

In some examples, one or more dimensions of the body 224A/B (e.g., depth and/or width of profiles burned in the outside edge 228A/B of the side surface 226A/B) may be configured to accommodate banding of handling provisions (e.g., 4 inch by 6 inch materials) to the counterweight assembly 200A/B to permit handling with forks. This represents an improvement over standard wooden pallets for internal assembly production plants and inventory storage yards and can provide benefits for end customers that prefer to handle the counterweight assembly 200A/B with forks, over rigging, or as a practical way to keep the counterweight assembly 200A/B off the ground when stored in a yard.

Referring to FIG. 3A, the step 236A is perpendicular to the upper portion 238A and the lower portion 240A of the inside edge 230A. Referring to FIG. 3B, the step 236B is oblique to the upper portion 238B and the lower portion 240B of the inside edge 230B.

Referring, collectively, to FIGS. 3A-B, the center slab 210A/B may include a pocket 254A/B in the side surface 226A/B (e.g., along the upper portion 238A/B). The pocket 254A/B may be defined, at least in part, by slabs surrounding the center slab 210A/B (e.g., inner slabs 208A/B and 212A/B). In some examples, a machine system device (e.g., a radio frequency identification (RFID) tag) may be disposed in the pocket 254A/B. For example, the pocket 254A/B may be configured to shield, or protect, the RFID tag. As indicated above, FIGS. 3A-B are provided as examples. Other examples may differ from what was described in connection with FIGS. 3A-B.

FIG. 4A is an enlarged diagram of a lifting eye portion of the example center counterweight slab 210A, of the first counterweight assembly 200A, described herein. FIG. 4B is an enlarged diagram of a lifting eye portion of the example center counterweight slab 210B, of the second counterweight assembly 200B, described herein.

Referring, collectively, to FIGS. 4A-B, the lifting eye 201A/B includes first and second lateral surfaces and a side surface that may be continuous with the first lateral surface 242A/B, the second lateral surface 250A/B, and the side surface 226A/B, respectively, of the body 224A/B of the center slab 210A/B. For example, a thickness of the lifting eye 201A/B along axis 244 (e.g., parallel to the side surface 226A/B shown in FIGS. 3A-B) from the first lateral surface 242A/B to the second lateral surface 250A/B may be equal to a thickness of the body 224A/B of the center slab 210A/B (e.g., along the side surface 226A/B). In some examples, the thickness of the body 224A/B and/or the lifting eye 201A/B may be about 3 inches or greater (e.g., about 3 inches). In some other examples, the thickness of the lifting eye 201A/B may be different from (e.g., less than) the thickness of the body 224A/B, such that one or more lateral surfaces of the lifting eye 201A/B may be recessed relative to a corresponding surface, of the first and second lateral surfaces, of the body 224A/B.

The lifting eye 201A/B may have a rounded shape (e.g., U-shaped, such as an inverted U-shape). The lifting eye 201A/B extends past the top edge 232A/B of the body 224A/B by a first distance d1. The first distance d1 may be about 3 inches or greater, such as within a range of about 3 inches to about 5 inches (e.g., about 4 inches). The lifting eye 201A/B includes an opening 246 that is aligned with the axis 244. In some examples, the opening 246 may extend between the first lateral surface 242A/B and the second lateral surface 250A/B (e.g., from the first lateral surface 242A/B to the second lateral surface 250A/B). In some examples, the opening 246 is shaped to match the shape, or profile, of the lifting eye 201A/B (e.g., along the side surface 226A/B), such that the lifting eye 201A/B has a fixed distance between the opening 246 and the side surface 226A/B.

A second distance d2 (e.g., a width of the opening 246) and a third distance d3 (e.g., a height of the opening 246), perpendicular to the second distance d2, associated with the opening 246 may be sized to accommodate shackle sizes that are commonly used on job sites with heavy equipment. For example, the width and height may be equal to each other to be optimized to receive a round pin (e.g., a clevis pin 248) through the opening 246. For example, the second distance d2 and/or the third distance d3 may be about 2.25 inches or greater, such as within a range of about 2.25 inches to about 2.75 inches (e.g., 2.5 inches). When the second distance d2 and the third distance d3 are greater than 2.25 inches, the opening 246 is able to accommodate the clevis pin 248 (shown in phantom) that corresponds to a 35 ton shackle (e.g., a 2 inch nominal size G-209/S-209 screw pin anchor shackle with working load limit of 35 tons). Notably, the minimum size of the opening 246 of the lifting eye 201A/B described herein is to accommodate shackle sizes that are commonly used on job sites with heavy equipment (e.g., up to 35 tons). In some examples, an oversized shackle may be required in order for the U-shaped clevis to fit around the lifting eye 201A/B. For example, based on the thickness of the body 224A/B and/or the lifting eye 201A/B (e.g., 3 inches or greater as described above), a 35 ton shackle may be required to fit around the lifting eye 201A/B, and thus, the opening 246 in the lifting eye 201A/B may be sized to accommodate the clevis pin 248 corresponding to the 35 ton shackle even though a smaller shackle, and corresponding clevis pin, with a 5 ton working limit would be sufficient.

The lifting eye 201A/B includes a chamfer 252 around the opening 246 (e.g., around an outer edge of the opening 246, which also may be referred to herein as "an inner edge of the lifting eye"). The chamfer 252 may prevent, or at least reduce, abrasion of a lifting device (e.g., a strap) engaged with the lifting eye 201A/B that is caused by direct contact (e.g., rubbing) between the lifting device and the edge of the opening 246. In some examples, based on a weight of the counterweight assembly 200A/B and/or the type of equipment that is available at the job site, the lifting device may include one or more of straps, chains, or shackles that are to be engaged with the lifting eye 201A/B. In certain examples, the chamfer may be omitted.

As indicated above, FIGS. 4A-B are provided as examples. Other examples may differ from what was described in connection with FIGS. 4A-B.

FIG. 5 is a flow diagram of an example method 500 of manufacturing a counterweight slab described herein (e.g., center slab 210A/B). At 510, the method 500 includes cutting, with a plasma torch (which also may be referred to herein as "burning," "plate burning," or "flame cutting"), a laser, or a waterjet, a profile of the counterweight slab from a larger steel slab. To cut the center slab 210A/B via burning, the larger steel slab needs to be sized and shaped based on a profile of the center slab 210A/B including the lifting eye 201A/B. For example, the larger steel slab may include 2 or more nested profiles. Because material is cut from the larger steel slab to form the lifting eye 201A/B, some material from around the lifting eye 201A/B is wasted. In order to reduce waste, the distance d1 may be kept to a minimum that is able to achieve the desired size range for the opening 246 described above.

The profile may correspond to a shape of a lateral surface (e.g., first lateral surface 242A/B) of the body 224A/B of the center slab 210A/B, including the lifting eye 201A/B. For example, the profile in the body 224A/B may include an outer shape (e.g., corresponding to the side surface 226A/B) and an inner shape (e.g., corresponding to the opening 246). For example, burning the profile at 510 may include, first, burning the outer shape of the body 224A/B, and second, poking through the lifting eye 201A/B, at a position that is within the inner edge of the lifting eye, and burning the inner shape, or vice versa. Accordingly, the lifting eye 201A/B is monolithic with (which also may be referred to herein as "integral with" or "embedded in") the entirety of the center slab 210A/B. In other words, the center slab 210A/B, including the lifting eye 201A/B, may be embodied as a single piece solid body. For example, the lifting eye 201A/B may be part of, or monolithic with, the body 224A/B, of the center slab 210A/B, without being bolted on, or welded on, to the body 224A/B. In contrast to potential alternative configurations, some of which may be known in the industry, the lifting eye 201A/B of the present disclosure is fabricated together (e.g., in a single step or operation) with the center slab 210A/B (e.g., via burning). For example, cutting the profile of the center slab 210A/B may include forming the opening 246. Therefore, in contrast to potential alternative configurations, the lifting eye 201A/B of the present disclosure is not attached to the center slab 210A/B in a secondary operation (e.g., with welds, rods, pins, and/or hinges).

At 520, the method 500 includes forming one or more chamfers 252 into the lifting eye 201A/B. For example, the one or more chamfers 252 may be formed via machining the counterweight slab (e.g., the center slab 210A/B) with a machine tool. For example, the machine tool may be a milling machine, chamfering tool, deburring tool, beveling tool, or drilling tool. Respective dimensions of the one or more chamfers 252 may correspond to a cutter of the machine tool. In some examples, the one or more chamfers 252 may be formed via burning (e.g., according to the same process described above for cutting the profile of the counterweight slab). For example, an angle of the plasma torch, laser, or waterjet may be selected to cut the desired angle of the one or more chamfers 252. In certain examples, the one or more chamfers 252 may be omitted, as described above.

In some examples, the method 500 may include one or more additional blocks. For example, the counterweight slabs include a specification for flatness to ensure that the individual slabs stack together properly. Even when the flatness specification is generous, there may be instances where a secondary operation is needed in case of distortion.

As indicated above, FIG. 5 is provided as an example. Other examples may differ from what was described in connection with FIG. 5. Although FIG. 5 shows example blocks of method 500, in some implementations, method 500 may include additional blocks, fewer blocks, different blocks, or differently arranged blocks than those depicted in FIG. 5. Additionally, or alternatively, two or more of the blocks of method 500 may be performed in parallel.

INDUSTRIAL APPLICABILITY

Counterweights may be associated with lifting machines, such as pipelayer machines, to counteract the weight of an object being lifted in order to increase lifting capacity and resist tipping. For example, during operation, a pipelayer machine may extend the weight of a pipeline segment laterally away from the chassis, engine, and undercarriage of the pipelayer machine (e.g., with the weight being cantilevered out over surrounding terrain). Depending on the weight of the segment being lifted and the length of the boom, the counterweight may be movable to change a center of gravity of the pipelayer machine to further resist potential tipping and instability.

Generally, counterweights are to be installed and removed from machines as needed. For example, different counterweights and/or sizes of counterweights may be used on the same machine. Counterweights that have bolted on or welded on lifting hardware (e.g., lifting eyes or loops) have greater inherent risk of failure from loose connections or crack welds and/or may require extra machining or welding operations to add the bolted on or welded on lifting hardware to the counterweights. Accordingly, bolted on or welded on lifting hardware may be less robust (e.g., lower strength), less safe, more prone to failure, and higher cost.

Lifting eyes that are embedded with the counterweights, according to examples described herein, are more robust (e.g., higher strength), safer, less prone to failure, and lower cost compared to bolted on or welded on lifting hardware. Burning the lifting eye to shape within the overall profile of the counterweight slab is cost-efficient. For example, the cost of burning the extra profile corresponding to the embedded lifting eye, compared to the cost of burning the other counterweight slabs, is negligible.

Lifting eyes that are embedded with the counterweights, according to examples described herein, may be especially applicable for counterweight assemblies with a center slab (e.g., counterweight assembles with an odd number of individual slabs, such as 3, 5, or 7 total slabs). For example, the center of gravity for the entire assembly needs to be positioned directly under the lifting eye (e.g., to assist sliding the mounting structure of the counterweight assembly onto the machine). Only with an odd number of slabs, current slab thicknesses may be kept, and the center slab can be replaced with a new center slab with the embedded lifting eye.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A counterweight assembly, for a lifting machine, comprising:
   a plurality of counterweight slabs, including:
      first and second outer counterweight slabs; and
      one or more inner counterweight slabs sandwiched between inner lateral surfaces of the first and second outer counterweight slabs,
         wherein a center slab, of the one or more inner counterweight slabs, includes a lifting eye embedded in a body of the center slab, and
         wherein the center slab further includes:
            an outside edge;
            an inside edge having a step defining an upper portion and a lower portion;
            a top edge connecting the outside edge and the upper portion; and
            a bottom edge connecting the outside edge and the lower portion,
               wherein the lifting eye extends past the top edge.

2. The counterweight assembly of claim 1, wherein the center slab further includes:
   a first lateral surface;
   a second lateral surface facing away from the first lateral surface; and
   a side surface that connects together the first lateral surface and the second lateral surface,
      wherein the lifting eye includes an opening that is aligned with an axis that is parallel to the side surface.

3. The counterweight assembly of claim 2, wherein the first lateral surface is a front surface configured to face a forward direction of the lifting machine, and
   wherein the second lateral surface is a rear surface configured to face a reverse direction of the lifting machine.

4. The counterweight assembly of claim 2, wherein the lifting eye includes a chamfer around the opening that is configured to prevent abrasion of a lifting device engaged with the lifting eye.

5. The counterweight assembly of claim 2, wherein a thickness of the lifting eye along the axis is equal to a thickness of the body along the side surface.

6. The counterweight assembly of claim 1, wherein the plurality of counterweight slabs are assembled together, with bolts or welds, into a unitized block.

7. The counterweight assembly of claim 1, wherein lifting eye is monolithic with the body of the center slab without being bolted on or welded on to the body.

8. The counterweight assembly of claim 1, wherein non-center slabs, of the plurality of counterweight slabs, are formed from a low grade steel material, and wherein the center slab is formed from a higher grade steel material, compared to the non-center slabs.

9. The counterweight assembly of claim 1, wherein the lifting eye includes a chamfer that is configured to prevent abrasion of a lifting device engaged with the lifting eye.

10. A counterweight assembly, for a lifting machine, comprising:
    a plurality of counterweight slabs, including:
       first and second outer counterweight slabs; and
       one or more inner counterweight slabs sandwiched between inner lateral surfaces of the first and second outer counterweight slabs,
          wherein a center slab, of the one or more inner counterweight slabs, includes a lifting eye embedded in a body of the center slab,
          wherein non-center slabs, of the plurality of counterweight slabs, are formed from a low grade steel material, and
          wherein the center slab is formed from a higher grade steel material, compared to the non-center slabs.

11. The counterweight assembly of claim 10, wherein the center slab further includes:
    a first lateral surface;
    a second lateral surface facing away from the first lateral surface; and
    a side surface that connects together the first lateral surface and the second lateral surface,
       wherein the lifting eye includes an opening that is aligned with an axis that is parallel to the side surface.

12. The counterweight assembly of claim 10, wherein the lifting eye includes a chamfer that is configured to prevent abrasion of a lifting device engaged with the lifting eye.

13. The counterweight assembly of claim 10, wherein lifting eye is monolithic with the body of the center slab without being bolted on or welded on to the body.

14. A counterweight slab, for a lifting machine, having a body, comprising:
    a first lateral surface;
    a second lateral surface facing away from the first lateral surface;
    a side surface that connects together the first lateral surface and the second lateral surface; and
    a lifting eye embedded in the body,
       wherein the lifting eye includes an opening that is aligned with an axis that is parallel to the side surface, and
       wherein the lifting eye includes a chamfer around the opening that is configured to prevent abrasion of a lifting device to be engaged with the lifting eye.

15. The counterweight slab of claim 14, wherein the body of counterweight slab further includes:
    an outside edge;
    an inside edge having a step defining an upper portion and a lower portion;
    a top edge connecting the outside edge and the upper portion; and
    a bottom edge connecting the outside edge and the lower portion,
       wherein the lifting eye extends past the top edge.

16. The counterweight slab of claim 14, wherein a thickness of the lifting eye along the axis is equal to a thickness of the body along the side surface.

17. The counterweight slab of claim 14, wherein lifting eye is monolithic with the body of the counterweight slab without being bolted on or welded on to the body.

18. The counterweight slab of claim 14, wherein the first lateral surface is a front surface configured to face a forward direction of the lifting machine, and
    wherein the second lateral surface is a rear surface configured to face a reverse direction of the lifting machine.

19. The counterweight slab of claim 14, wherein the counterweight slab is configured to be assembled together, with a plurality of other counterweight slabs, into a unitized block.

* * * * *